Dec. 6, 1955 L. SHEBESTA 2,725,830
ROLLING PIN
Filed April 21, 1950

INVENTOR.
LEO SHEBESTA
BY
Christian R. Nielsen
ATTORNEY.

United States Patent Office 2,725,830
Patented Dec. 6, 1955

2,725,830

ROLLING PIN

Leo Shebesta, Mishicot, Wis.

Application April 21, 1950, Serial No. 160,080

1 Claim. (Cl. 107—50)

This invention relates to improvements in kitchen utensils, and more particularly to rolling pins to be used in households, bakeries, etc., and it is an object of the invention to provide a pin of this character having the roller thereof detachably mounted.

A further object of the invention is to so construct a rolling pin provided with a detachable handle whereby it can be conveniently operated with one hand.

A still further object of the invention is the production of a rolling pin with a detachable handle which is simple and inexpensive in construction yet serviceable for the purpose for which it is intended.

Another object of the invention is the provision of a rolling pin provided with pins on each end and a separate handle and a support having resilient elements acting as bearings for the pins.

These and other objects and advantages are successfully attained in the structure hereinafter described and defined in the appended claim and illustrated in the accompanying drawing, which form a part of this application, and in which like characters of reference indicate corresponding parts throughout the several views.

Figure 1:
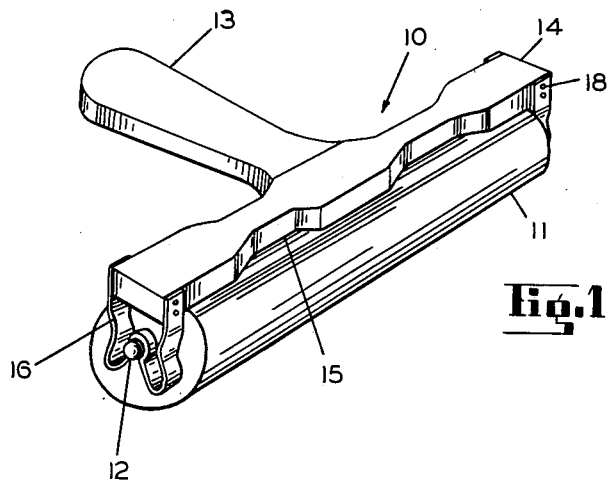
Figure 1 is a view in perspective of the complete assembled invention.
Figure 2:
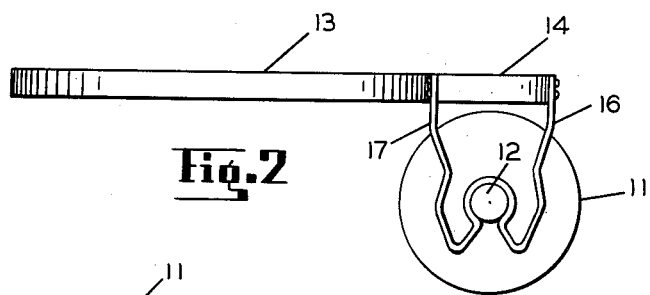
Figure 2 is a side view of the invention.
Figure 3:
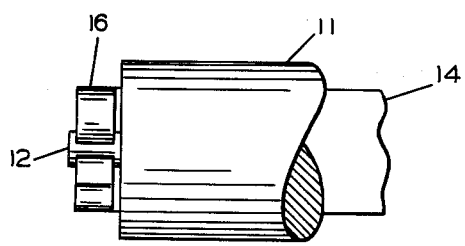
Figure 3 is a detail sectional end view of the rolling pin journalled in a resilient member.
Figure 4:
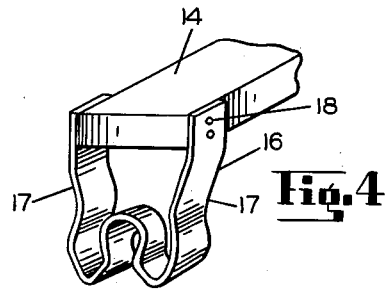
Figure 4 is a view in perspective of one of the resilient members connected to the end of the handle support.
Figure 5:
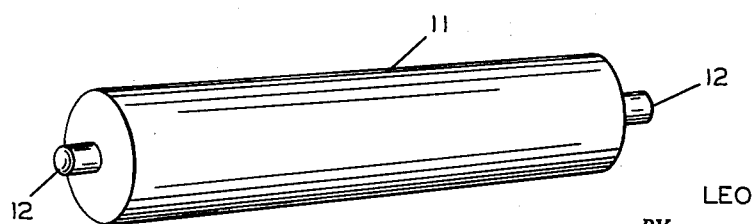
Figure 5 is a perspective view of the rolling pin.

Referring to the drawing in detail, the numeral 10 designates the device as a whole comprising a rolling pin 11 having end pins 12.

The support comprises a handle 13 and a longitudinal member 14 integral with the handle 12, or connected to one end of the handle 13 by any suitable connecting means. This support is preferably flat and provided with a plurality of recessed sections 15. Each end of member 14 provides supporting means for spring elements 16 which are formed integral with a pair of legs 17, each of which is disposed on one side of the member 14 and fastened thereto by fastening elements 18.

The spring elements 16 are spaced a sufficient amount so that each element may readily slip over a corresponding pin 12.

In operation, the handle 13 may be grasped by one hand and caused to roll over the dough to be prepared for baking in the usual manner. Incidentally, by providing an arrangement as heretofore described and shown, an operator using the device is free to use the other hand to manipulate the dough.

The device may be very cheaply constructed, and because of the detachable support, obviously it may be easily cleaned.

From the foregoing description, taken in connection with the accompanying drawing, the advantages of the construction and of the method of operation will be readily apparent to those skilled in the art to which the invention appertains, and while the principle of operation of the invention has been described together with the device which is considered to be the best embodiment thereof, it is to be understood that the device shown is merely illustrative and that such changes may be made as are within the scope of the claimed invention.

I claim:

A rolling pin of the character described comprising in combination, an elongated support member, an elongated cylindrical roller detachably mounted on said support, said roller being provided with outwardly extending shafts at each end thereof, a pair of attaching members constructed of resilient flat band-material for mounting said roller on said support, each of said attaching members comprising a circular loop portion terminating in a pair of oppositely disposed spaced ends, said spacing being of less extent than the diameter of said loop, said loop being of a size to snugly and detachably fit said roller shafts to form a bearing therefor, a leg member flanking each side of said loop, an angular portion integrally joined to one end of said leg members and the respective loop end adjacent thereto, and the opposite ends of each pair of said leg members being attached to opposite sides of each end of said elongated member, whereby said angular portions guide said shafts into said bearings during insertion of said roller and whereby pressure imposed on said support member during rolling, constricts the spacing of said loop ends.

References Cited in the file of this patent

UNITED STATES PATENTS

| | | |
|---|---|---|
| 185,265 | Shunk | Dec. 12, 1876 |
| 241,253 | Twele | May 10, 1881 |
| 334,477 | Schmidt | Jan. 19, 1886 |
| 335,616 | Patrick | Feb. 9, 1886 |
| 403,822 | Bartholomew | May 21, 1889 |
| 1,100,853 | Thompson | June 23, 1914 |
| 1,323,410 | Sams | Dec. 2, 1919 |
| 1,575,209 | Jespersen | Mar. 2, 1926 |
| 1,699,937 | Yablick | Jan. 22, 1929 |
| 2,538,151 | Grasak | Jan. 16, 1951 |

FOREIGN PATENTS

| | | |
|---|---|---|
| 168,085 | Switzerland | June 1, 1934 |